United States Patent
Sawa et al.

(10) Patent No.: US 10,233,306 B2
(45) Date of Patent: *Mar. 19, 2019

(54) OXYGEN-ABSORBING RESIN COMPOSITION

(71) Applicant: TOYO SEIKAN GROUP HOLDINGS, LTD., Tokyo (JP)

(72) Inventors: Yoshiki Sawa, Kanagawa (JP); Yukiko Hirayama, Kanagawa (JP); Toshiki Yamada, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 583 days.

This patent is subject to a terminal disclaimer.

(21) Appl. No.: 14/362,492

(22) PCT Filed: Dec. 26, 2012

(86) PCT No.: PCT/JP2012/083601
§ 371 (c)(1),
(2) Date: Jun. 3, 2014

(87) PCT Pub. No.: WO2013/099921
PCT Pub. Date: Jul. 4, 2013

(65) Prior Publication Data
US 2014/0335297 A1    Nov. 13, 2014

(30) Foreign Application Priority Data
Dec. 26, 2011 (JP) .................... 2011-284017

(51) Int. Cl.
*C08K 5/3417* (2006.01)
*B32B 1/02* (2006.01)
(Continued)

(52) U.S. Cl.
CPC .............. *C08K 5/3417* (2013.01); *B32B 1/02* (2013.01); *B32B 27/08* (2013.01); *B32B 27/18* (2013.01);
(Continued)

(58) Field of Classification Search
CPC .. B65D 81/267; C08K 5/1535; C08K 5/1539; C08K 2201/012; C08K 5/3412;
(Continued)

(56) References Cited

U.S. PATENT DOCUMENTS 2,449,959 A    9/1948   Hanns et al.
6,254,803 B1   7/2001   Matthews et al.
(Continued)

FOREIGN PATENT DOCUMENTS

EP    0 214 112    3/1987
EP    0214112      3/1987
(Continued)

OTHER PUBLICATIONS

International Search Report dated Apr. 23, 2013 in PCT/JP2012/083601.
(Continued)

*Primary Examiner* — Lee E Sanderson
(74) *Attorney, Agent, or Firm* — Greenblum & Bernstein, P.L.C.

(57) ABSTRACT

An oxygen-absorbing resin composition containing a base resin having a thermoplastic resin; and an oxygen-absorbing component having at least the one selected from the group consisting of an ester, an amide, an imide or a dicarboxylic acid derived from an acid anhydride represented by the following formula (1),
(Continued)

[Chemical 1]

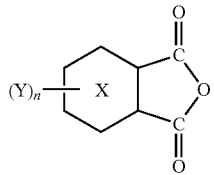

(1)

wherein,
a ring X is an aliphatic ring having an unsaturated bond,
n is a number of the substituents Y bonded to the ring X and is an integer of 0 or 1, and
Y is an alkyl group,
and a polymer having a constituent unit stemming from the acid anhydride. An oxygen-absorbing polyester resin composition exhibits excellent oxygen-absorbing property even in the absence of transition metal catalyst without accompanied by the deterioration of the polyester resin used as a the base resin, the oxygen-absorbing property being strong enough for maintaining gas-barrier properties.

5 Claims, 1 Drawing Sheet (51) Int. Cl.
| | |
|---|---|
| B32B 27/18 | (2006.01) |
| C08K 5/20 | (2006.01) |
| B32B 27/08 | (2006.01) |
| B32B 27/30 | (2006.01) |
| B32B 27/32 | (2006.01) |
| B32B 27/34 | (2006.01) |
| B32B 27/36 | (2006.01) |
| C08K 5/098 | (2006.01) |
| C08G 63/553 | (2006.01) |
| C08L 67/02 | (2006.01) |

(52) U.S. Cl.
CPC ............ B32B 27/306 (2013.01); B32B 27/32 (2013.01); B32B 27/325 (2013.01); B32B 27/34 (2013.01); B32B 27/36 (2013.01); C08G 63/553 (2013.01); C08K 5/098 (2013.01); C08K 5/20 (2013.01); C08L 67/02 (2013.01); B32B 2250/02 (2013.01); B32B 2250/03 (2013.01); B32B 2250/04 (2013.01); B32B 2250/05 (2013.01); B32B 2250/24 (2013.01); B32B 2307/412 (2013.01); B32B 2307/7244 (2013.01); B32B 2307/7246 (2013.01); B32B 2307/7248 (2013.01); B32B 2307/738 (2013.01); B32B 2439/46 (2013.01); B32B 2439/60 (2013.01); B32B 2439/70 (2013.01); C08K 2201/008 (2013.01); C08K 2201/012 (2013.01); Y10T 428/1352 (2015.01); Y10T 428/1397 (2015.01)

(58) Field of Classification Search
CPC ...... C08K 5/3415; C08K 5/20; C08K 5/3417; C08L 67/02
USPC ..... 428/35.2, 35.7, 36.8, 36.9, 36.91, 36.92; 252/188.28; 206/205; 524/89, 90, 91
See application file for complete search history.

(56) References Cited

U.S. PATENT DOCUMENTS

| | | | |
|---|---|---|---|
| 6,254,804 | B1 | 7/2001 | Matthews et al. |
| 6,946,175 | B2 | 9/2005 | Yang et al. |
| 7,056,565 | B1 | 6/2006 | Cai et al. |
| 7,097,890 | B1 | 8/2006 | Ching et al. |
| 7,696,300 | B2 | 4/2010 | Ohta et al. |
| 7,842,631 | B2 | 11/2010 | Tucker et al. |
| 8,592,522 | B2 | 11/2013 | Komatsu et al. |
| 2005/0075433 | A1 | 4/2005 | Manniion et al. |
| 2005/0075434 | A1 | 4/2005 | Mannion et al. |
| 2006/0024459 | A1* | 2/2006 | Itoh ............ B29C 55/005 428/35.7 |
| 2007/0036923 | A1 | 2/2007 | Ishizaki et al. |
| 2008/0227912 | A1 | 9/2008 | Ohta et al. |
| 2009/0098323 | A1 | 4/2009 | Ohta et al. |
| 2010/0087619 | A1 | 4/2010 | Ohta et al. |
| 2011/0275742 | A1* | 11/2011 | Akkapeddi ......... C08K 5/3415 524/89 |
| 2013/0284617 | A1 | 10/2013 | Yamada et al. |
| 2014/0117280 | A1* | 5/2014 | Ishii ................ B01D 53/02 252/188.28 |
| 2014/0220281 | A1* | 8/2014 | Black .............. C07D 307/89 428/36.92 |

FOREIGN PATENT DOCUMENTS

| | | | |
|---|---|---|---|
| EP | 1650265 | 4/2006 | |
| EP | 2669334 | 12/2013 | |
| JP | 62-43449 | 2/1987 | |
| JP | 2003-521552 | 7/2003 | |
| JP | 2004-161796 | 6/2004 | |
| JP | 2007-509196 | 4/2007 | |
| JP | 2008-38126 | 2/2008 | |
| JP | 4314637 | 5/2009 | |
| JP | 2011-014844 | 1/2011 | |
| JP | WO 2012157656 A1 * | 11/2012 | ............ B01D 53/02 |
| WO | 2005/010101 | 3/2005 | |
| WO | 2005/105887 | 11/2005 | |
| WO | 2007/058313 | 5/2007 | |
| WO | 2007/119657 | 10/2007 | |
| WO | 2011/140473 | 11/2011 | |
| WO | 2012/102086 | 8/2012 | |

OTHER PUBLICATIONS

European Search Report issued in European Patent Application No. 12863116.5, dated Jul. 15, 2015.
Extended European Search Report issued by European patent office in Application No. 12863116.5, dated Oct. 20, 2015.
Japanese Office Action issued in Patent Application No. 2013-551725, dated Sep. 27, 2016.

* cited by examiner

OXYGEN-ABSORBING RESIN COMPOSITION

TECHNICAL FIELD

This invention relates to a thermoplastic resin and, specifically, to a resin composition which contains a polyester resin as the base resin and, further, contains an oxygen-absorbing component to exhibit excellent oxygen-absorbing property. The invention is, further, related to packaging containers having a layer formed from the above resin composition.

BACKGROUND ART

Thermoplastic resins or polyester resins, such as polyethylene terephthalate (PET) and the like, excel in such properties as formability, transparency, mechanical strength and resistance against chemicals and, further, have relatively high barrier properties against gases such as oxygen and the like. Therefore, the polyester resins have been used in a variety of fields as such packaging materials as films, sheets and bottles. To improve the gas-barrier property of such packaging materials, further, there has been known a multilayer structure which includes, as an intermediate layer, a layer of a gas-barrier resin such as a saponified product of an ethylene/vinyl acetate copolymer or a polyamide having excellent gas-barrier property between an inner layer and an outer layer of a polyester resin via suitable adhesive resin layers.

From the standpoint of saving resources and decreasing the weight of the packaging containers such as polyester bottles that have been placed in the market, it has been desired to further decrease the thickness of the body portions. To meet the above requirement, further, it becomes necessary to suppress a decrease in the barrier property against the gases such as oxygen and the like caused by a reduction in the thickness, as a matter of course. In an embodiment that uses the gas-barrier resin, in this case, the container must be formed in a multiplicity of layers to shut off the permeation of gases making it difficult to decrease the thickness of the container to a sufficient degree.

Oxygen-barrier property can also be improved by using an inorganic oxygen absorber such as iron powder. The oxygen absorber by itself undergoes oxidation to absorb oxygen; i.e., exhibits barrier property to shut off the permeation of oxygen upon absorbing oxygen. However, the inorganic oxygen absorber causes the resins to be colored and, therefore, cannot be used in the field of packaging where transparency is required. In the field of packaging, therefore, it is a general practice to use an organic oxygen absorber that does not cause resins to be colored.

A patent document 1, for example, proposes an oxygen-absorbing resin composition containing an oxidizable organic component (organic oxygen absorber) such as unmodified polybutadiene or maleic anhydride-modified polybutadiene.

Further, a patent document 2 proposes an oxygen-trapping composition containing a compound having an unsaturated alicyclic structure (cyclohexene structure) as an organic oxygen absorber.

For being oxidized, however, the above organic oxygen absorbers require a transition metal catalyst (e.g., cobalt or the like) which causes a variety of inconveniences. For example, the resin which is the base material is oxidized and deteriorated, too, together with the oxygen absorber, permitting oxygen to permeate through the wall of the base resin and without, therefore, much improving barrier property against oxygen. Besides, the base resin that is oxidized and deteriorated often brings about a decrease in the strength, too. Moreover, low-molecular decomposed products such as aldehyde and ketone are by-produced much, arousing such problems as the generation of offensive odor and a decrease in the property for retaining flavor of the contents. In the field of packaging, in particular, a decrease in the property for retaining flavor of the contents is a serious problem. When an organic oxygen absorber is used, therefore, it becomes necessary to employ a layer structure of which the resin layer blended with the organic oxygen absorber does not come in contact with the content in the container, i.e., to employ a multilayer structure. Therefore, the above-mentioned means is not suited for decreasing the thickness of the container wall.

A patent document 3 proposes a resin composition containing a resin that exhibits excellent oxygen-absorbing capability even under a condition where no transition metal catalyst is present. This resin composition contains, as an oxygen-absorbing resin, a polymer that has a constituent unit derived from a compound of an unsaturated alicyclic structure, such as $\Delta^3$-tetrahydrophthalic acid derivative obtained by the Diels-Alder reaction of, for example, a maleic anhydride and the diene. The oxygen-absorbing resin of this type is very reactive with oxygen, and not only exhibits excellent oxygen-absorbing property even under a condition where no transition catalyst is present but also by-produces no low molecular decomposition product that becomes a cause of offensive odor. Therefore, this oxygen-absorbing resin offers an advantage of forming excellent containers without losing flavor of the contents.

However, the oxygen-absorbing resin used in the patent document 3 has a problem in that the oxygen-absorbing property cannot be improved to a sufficient degree when it is used in combination with a polyester resin such as PET. That is, the above oxygen-absorbing resin has a glass transition temperature of −8° C. to 15° C. and in which the mobility of the molecules is very high in an atmosphere of room temperature. This mobility is one of the factors that produce excellent oxygen-absorbing property. However, the polyester resin such as PET used in the field of packaging containers has a glass transition temperature of about 70° C. and, therefore, its mobility at room temperature is very low. Therefore, even if the above oxygen-absorbing resin is made present together with the polyester resin, mobility of the molecules at room temperature remains suppressed and, as a result, oxygen-absorbing property cannot be produced to a sufficient degree.

Further, a patent document 4 proposed by the present applicant is disclosing an oxygen-absorbing resin composition of a polyolefin resin (A) obtained by polymerizing an olefin having 2 to 8 carbon atoms, that is blended with a resin (B) that works to trigger the oxidation of the resin (A) and a transition metal catalyst (C), and teaches the use of a styrene polymer as the resin (B).

However, the above resin composition, too, necessitates the use of the transition metal catalyst, and is used for imparting oxygen-absorbing property to the polyolefin resin, but is cannot be applied to the polyester resin.

As described above, there has not been known yet any oxygen absorber that exhibits excellent oxygen-absorbing property upon being added to a polyester resin (specifically, to a polyester resin of the packaging grade) without using transition metal catalyst.

PRIOR ART DOCUMENTS

Patent Documents

Patent document 1: JP-A-2004-161796
Patent document 2: JP-T-2003-521552
Patent document 3: JP-A-2008-38126
Patent document 4: Japanese Patent No. 4314637

OUTLINE OF THE INVENTION

Problems that the Invention is to Solve

It is, therefore, an object of the present invention to provide an oxygen-absorbing resin composition which exhibits excellent oxygen-absorbing property even in the absence of transition metal catalyst without accompanied by the deterioration of the thermoplastic resin that is used as a the base resin, the oxygen-absorbing property being strong enough for maintaining gas-barrier property that is desired in the field of, specifically, packaging containers.

Another object of the present invention is to provide an oxygen-absorbing resin composition which does not produce low molecular decomposed products that could become a cause of offensive odor at the time of absorbing oxygen and, therefore, is capable of forming containers of a single-layer structure making itself very useful for realizing containers of a decreased thickness.

A further object of the present invention is to provide a packaging container having a layer formed by using the above oxygen-absorbing resin composition.

Means for Solving the Problems

In studying the above oxygen-absorbing resin compositions, the present inventors have discovered that the acid anhydride having a certain kind of unsaturated alicyclic structure and derivatives thereof exhibit excellent oxygen-absorbing capability without causing the polyester to be oxidized or deteriorated if there is used in combination a compound containing benzylhydrogen in place of using a transition metal catalyst, and have filed a patent application (Japanese Patent Application No. 2011-014844). The present inventors have furthered the study concerning the oxygen-absorbing capability of the above acid anhydride and derivatives thereof, have discovered that, among them, the derivatives of the acid anhydride exhibits oxygen-absorbing capability to a suitable degree even without using the compound containing benzylhydrogen as the oxidation promoting component, assuring oxygen-barrier property required in the field of packaging containers, and have completed the invention.

Namely, according to the present invention, there is provided an oxygen-absorbing resin composition containing:

(A) a base resin which comprises a thermoplastic resin; and
(B) an oxygen-absorbing component which comprises at least the one selected from the group consisting of an ester, an amide, an imide or a dicarboxylic acid derived from an acid anhydride represented by the following formula (1),

[Chemical 1]

wherein, a ring X is an aliphatic ring having an unsaturated bond, n is a number of the substituents Y bonded to the ring X and is an integer of 0 or 1, and Y is an alkyl group,
and a polymer having a constituent unit stemming from the acid anhydride.

In the oxygen-absorbing resin composition of the present invention, it is desired that:
(1) In the above formula (1), n=1;
(2) The ring X is a cyclohexene ring;
(3) In the above formula (1), the ring X is a bicyclo ring having an unsaturated bond;
(4) The oxygen-absorbing component (B) is an imide obtained by heat-treating an amide that is formed by the reaction of the acid anhydride of the formula (1) with an amine; and
(5) The base resin (A) is a polyester resin.

The present invention, further, provides a packaging container forming, in the container wall thereof, at least one layer which comprises the above oxygen-absorbing resin composition.

The packaging container can employ an embodiment in which the layer of the above oxygen-absorbing resin composition is formed at a position where it comes in contact with the content in the container. Specifically, the packaging container can assume a single-layer structure in which the container wall comprises a layer of the above oxygen-absorbing resin composition only.

Effects of the Invention

The oxygen-absorbing resin composition of the present invention has a distinguished feature in that it contains an acid anhydride having an unsaturated alicyclic structure represented by the above formula (1) as the oxygen-absorbing component (B) (i.e., as the oxidizable component). That is, as also demonstrated in Examples described later, the oxygen-absorbing component (B) exhibits sufficiently high oxygen-absorbing capability in an atmosphere of about room temperature to about 50° C. even without using in combination such an oxidation acceleration component as transition metal catalyst or a compound having benzylhydrogen, and, when it is used for the packaging containers such as bottles, makes it possible to assure oxygen-barrier property practically quite free of problems.

The oxygen-absorbing component (B) has a very high thermal decomposition start temperature (about 200° C. or higher) as measured by the TGA. Therefore, the oxygen-absorbing component (B) exhibits its oxygen-absorbing capability to a sufficient degree without being deteriorated even if it is subjected to the conditions for forming the polyester such as polyethylene terephthalate into containers such as bottles.

Further, the oxygen-absorbing capability of the oxygen-absorbing component (B) is such that the oxygen is absorbed by the autoxidation, and the unsaturatedly bonded portion in the aliphatic ring is cleaved by the oxidation. Therefore, when the oxygen-absorbing component (B) absorbs oxygen, there is by-produced no oxidized or decomposed product of a low molecular weight such as aldehyde or ketone. Due to the autoxidation, however, the oxygen-absorbing capability is exhibited even in the absence of the transition metal catalyst not only suppressing the formation of low-molecular decomposed products by-produced as a result if using the transition metal catalyst but also effectively avoiding a decrease in the strength or in the gas-barrier property due to, for example, the polyester resin that is oxidized and deteriorated.

By using the oxygen-absorbing resin composition of the present invention, there can be formed packaging containers having excellent oxygen-barrier property yet suppressing the by-production of decomposed products of low molecular weights that could become a cause of offensive odor or a decrease in the flavor-retaining property when oxygen is absorbed (at the time of oxidation). It is, therefore allowed to form a layer of the resin composition at a position where it comes in contact with the contents in the container. That is, since by-production of oxidized or decomposed products of low molecular weights is suppressed, there is no probability of loss of flavor of the content in the container despite the above layer comes in contact with the content in the container.

Therefore, when a packaging container is formed by using the oxygen-absorbing resin composition of the present invention to improve its oxygen-barrier property, the container wall can be formed maintaining an increased degree of freedom, a multilayer structure can be realized including a layer of the oxygen-absorbing resin composition formed at any position and, besides, a single-layer structure can also be realized forming the container wall with only the layer of the oxygen-absorbing resin composition. Specifically, even when there is formed a container of the single-layer structure using neither a transition metal catalyst nor a particular oxidation promoter, excellent oxygen-barrier property can be maintained owing to its excellent oxygen-absorbing property. Therefore, the oxygen-absorbing resin composition of the present invention is very advantageous for decreasing the thickness and weight of the containers and for decreasing the cost.

MODES FOR CARRYING OUT THE INVENTION

The oxygen-absorbing resin composition of the present invention contains a base resin (A) (i.e., a resin component that serves as a matrix) which is a thermoplastic resin and, most desirably, a polyester resin, and a predetermined oxygen-absorbing component (B). As required, further, there can be added known blending agents that have been used for the resin compositions of this type.

<Base Resin (A)>

As the base resin (A), there can be used any thermoplastic resin so far as it is formable. As the base resin (A), for example, there can be used:

olefin resins such as low-density polyethylene, high-density polyethylene, polypropylene, poly 1-butene, poly 4-methyl-1-pentene, random or block copolymer of α-olefins such as ethylene, propylene, 1-butene, 4-methyl-1-pentene, and cyclic olefin copolymer;

ethylene-vinyl copolymers such as ethylene-vinyl acetate copolymer, ethylene-vinyl alcohol copolymer and ethylene-vinyl chloride copolymer;

styrene resins such as polystyrene, acrylonitrile-styrene copolymer, ABS and α-methylstyrene-styrene copolymer;

vinyl resins such as polyvinyl chloride, polyvinylidene chloride, vinyl chloride-vinylidene chloride copolymer, methyl polyacrylate and methyl polymethacrylate;

polyamide resins such as nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resins;

polyphenylene oxide resins; and biodegradable resins such as polylactic acid and the like.

It is, of course, allowable to use, as the base material (A), a blend of these thermoplastic resins so far as it does not impair the formability.

For the use as a packaging material such as of containers, specifically, the polyester resin and the olefin resin can be preferably used since they can be formed at relatively low forming temperatures. Among them, the polyester resin is most desired since it causes the oxygen-absorbing component that will be described later to be thermally deteriorated little and makes it possible to secure a high gas-barrier property.

The polyester resin should have a molecular weight at least large enough for forming films. For instance, a polyester resin having an intrinsic viscosity (I.V.) in a range of 0.6 to 1.40 dl/g and, specifically, 0.63 to 1.30 dl/g can be used as the base resin (A). Specifically, there can be used a thermoplastic polyester that can be biaxially stretch-blow formed and crystallized, such as polyethylene terephthalate (PET), polybutylene terephthalate and polyethylene naphthalate, as well as a blend of these polyesters with polycarbonate or arylate resin.

In the present invention, it is particularly desired to use the PET type polyester of the packaging grade of which not less than 60 mol % and, preferably, not less than 80 mol % of the ester recurring unit is an ethylene terephthalate unit. As described already, the PET type polyester of the packaging grade has a glass transition point (Tg) of as high as 50 to 90° C. and, specifically, 55 to 80° C. and a melting point (Tm) in a range of from about 200 to about 275° C.

As the PET type polyester, a homopolyethylene terephthalate is best suited. However, a copolymerized polyester having a content of the ethylene terephthalate unit within the above range, too, can be preferably used.

In the copolymerized polyester, examples of the dibasic acid other than the terephthalic acid include:

aromatic dicarboxylic acids such as isophthalic acid, phthalic acid and naphthalenedicarboxylic acid;

alicyclic dicarboxylic acids such as cyclohexanedicarboxylic acid and the like acid;

aliphatic dicarboxylic acids such as succinic acid, adipic acid, sebacic acid and dodecanedioic acid;

which can be used in one kind or in two or more kinds in combination. As the diol component other than the ethylene glycol, there can be used one or two or more of propylene glycol, 1,4-butanediol, diethylene glycol, 1,6-hexylene glycol, cyclohexanedimethanol and ethylene oxide adduct of bisphenol A.

The dibasic acid component stemming from the acid anhydride that is constituting the oxygen-absorbing component (B) described below can often be introduced by ester exchange or the like as a copolymerizable component into the PET type polyester.

<Oxygen-absorbing Component (B)>

In the present invention, the oxygen-absorbing component (B) that absorbs oxygen is at least the one selected from the group consisting of an ester, an amide, an imide or a dicarboxylic acid derived from an acid anhydride represented by the following formula (1),

[Chemical 1]

(1)

wherein a ring X is an aliphatic ring having an unsaturated bond, n is a number of the substituents Y bonded to the ring X and is an integer of 0 or 1, and Y is an alkyl group, and a polymer having a constituent unit stemming from the acid anhydride.

That is, if the above oxygen-absorbing component (B) comes in contact with oxygen, the unsaturatedly bonded portion in the unsaturated aliphatic ring X is easily oxidized enabling oxygen to be absorbed, and thus the oxygen-absorbing property is exhibited. This kind of to-be-oxidized property is not exhibited by the unsaturated bond in the aromatic ring.

If the unsaturated bond in the unsaturated aliphatic ring X is oxidized, the ring X is merely cleaved, but low molecular decomposed products (e.g., ketone and aldehyde) are not by-produced by oxidation. Therefore, despite of using the compound having the unsaturated aliphatic ring X as the oxygen-absorbing component (B), no offensive odor generates when oxygen is absorbed. Therefore, the packaging container formed from the resin composition containing the above compound has an advantage in that there is no decrease in the property for retaining the flavor of the content in the container. That is, when the container is formed by using the oxygen-absorbing polyester composition, the layer comprising the oxygen-absorbing polyester composition can be arranged on the side where it comes in contact with the content in the container. Moreover, the container can be formed of only the layer of the oxygen-absorbing polyester composition (i.e., single-layer structure). With the container being of the single-layer structure, in particular, the layer exhibits favorable oxygen-barrier property due to its excellent oxygen-absorbing property. It is, therefore, allowed to decrease the thickness of the container wall which is very advantageous from the standpoint of reducing the weight of the container and saving resources.

In the present invention, the acid anhydride represented by the above general formula (1) itself cannot be used as the oxygen-absorbing component (B). That is, the oxygen-absorbing component (B) must be a polymer incorporating therein an ester, an amide, an imide or a dicarboxylic acid obtained by reacting the acid anhydride with various kinds of reaction species, or incorporating therein a constituent unit stemming from the acid anhydride (hereinafter, the above polymer is often abbreviated as "acid anhydride derivative"). That is, the acid anhydride represented by the general formula (1) itself cannot exhibit the oxygen-absorbing capability to a sufficient degree at, for example, room temperature to 50° C. If used for the packaging container, therefore, the oxygen-barrier property is not enough for preventing the content from being oxidized and deteriorated.

Though the acid anhydride represented by the general formula (1) itself cannot exhibit oxygen-absorbing capability to a sufficient degree, the acid anhydride derivative derived from the acid anhydride exhibits high oxygen-absorbing capability. Though the reason has not been clarified yet, the present inventors presume it as described below. That is, as will be understood from the measured results of the thermogravimetric analyses (TGA) shown in FIGS. 1 and 2, the acid anhydride has a considerably low thermal decomposition start temperature at which the weight starts decreasing whereas the acid anhydride derivative has a thermal decomposition start temperature which is considerably as high as about 200° C. or higher. It is, therefore, presumed that the acid anhydride derivative formed into a container such as bottle or the like withstands the thermal hysteresis to a sufficient degree and effectively suppresses the thermal deterioration.

In the formula (1) representing the acid anhydride which is the starting material of the acid anhydride derivative used as the oxygen-absorbing component (B), the ring X is an aliphatic ring having an unsaturated bond, such as cyclohexene ring or, bicyclo[2.2.1]hepto-2-en, tricycle[4.4.0.1$^{2,5}$]-3-undecene, tetracyclo[4.4.0.1$^{2,5}$.1$^{7,10}$]-3-dodecene, pentacyclo[8.4.0.1$^{2,5}$.1$^{9,12}$.0$^{8,13}$]-3-hexadecene, or pentacyclo[6.6.1.1$^{3,6}$.0$^{2,7}$.0$^{9,14}$]-4-hexadecene, represented by the following formulas. From such a standpoint that the larger the number of the unsaturated bonding groups per a unit weight of the oxygen-absorbing component the more it is advantageous in the oxygen-absorbing capability, it is desired to use the cyclohexene ring or the bicyclo ring having an unsaturated bond and, specifically, to use the cyclohexene ring or the bicyclo[2.2.1]hepto-2-en.

[Chemical 3]

,

Bicyclo
[2.2.1]
hepto-2-en

[Chemical 4]

, tricyclo [4.4.0.1$^{2,5}$]-3
-undecene

[Chemical 5]

tetracyclo
[4.4.0.1$^{2.5}$.1$^{7.10}$]-3-
dodecene

[Chemical 6]

pentacyclo
[8.4.0.1$^{2.5}$.1$^{9.12}$.0$^{8.13}$]-3-
hexadecene

[Chemical 7]

pentacyclo
[6.6.1.1$^{3.6}$.0$^{2.7}$.0$^{9.14}$]-4-
hexadecene

The position of the unsaturated bond of when the aliphatic ring X is a cyclohexene ring may be either the third position or the fourth position, but is particularly preferably the third position from the standpoint of to-be-oxidized property. If the aliphatic ring X is a bicycle[2.2.1]hepto-2-en, the position of the unsaturated bond is the third position from the standpoint of stability.

In the above formula (1), Y is an alkyl group. Though there is no particular limitation, it is, usually, desired that the alkyl group is a lower alkyl group having not more than 3 carbon atoms and, specifically, a methyl group from the standpoint of synthesis and to-be-oxidized property. The bonding position thereof is, usually, either the third position or the fourth position if the aliphatic ring X is a cyclohexene ring, and is the third position if the aliphatic ring X is the bicyclo[2.2.1]-hepta-2-en.

In the above formula (1), n is the number of the substituents Y bonded to the ring X, and is an integer of 0 or 1. Desirably, however, n is 1 since it has been proved through experiment that a specifically high oxygen-absorbing capability is exhibited in this case.

The acid anhydride represented by the formula (1) is the alkyltetrahydrophthalic anhydride which is obtained by the Diels-Alder reaction of the maleic anhydride with the diene, is obtained in the form of a mixture of isomers, and is used in the form of the mixture as the oxygen-absorbing component (B).

In the present invention, the most preferred examples of the acid anhydride which is the starting material for forming the acid anhydride derivative include a 3-methyl-Δ$^4$-tetrahydrophthalic anhydride represented by the following formula (2), a 4-methyl-Δ$^3$-tetrahydrophthalic anhydride represented by the following formula (3), a 5-norbornene-2,3-dicarboxylic anhydride represented by the following formula (4) and a methyl-5-norbornene-2,3-dicarboxylic anhydride represented by the following formula (5).

[Chemical 8]

(2)

[Chemical 9]

(3)

[Chemical 10]

(4)

[Chemical 11]

(5)

In the present invention, the ester, amide, imide or dicarboxylic acid derived from the acid anhydride can be used as the oxygen-absorbing component (B).

Further, a polymer incorporating the above acid anhydride as a constituent unit, too, can be used as the oxygen-absorbing component (B).

Of the above derivatives, the ester is an ester obtained by reacting an acid anhydride such as alkyltetrahydrophthalic anhydride with various kinds of alcohols. There is no special limitation on the alcohol used for the esterification, and there can be used either an aliphatic alcohol such as methyl alcohol or ethyl alcohol or aromatic alcohol such as phenol or the like. It is, further, allowable to use a polyhydric alcohol such as glycol or the like. If the polyhydric alcohol is used, it is allowed to introduce unsaturated alicyclic structures of a number corresponding to the number of alcohols in a molecule.

Further, the ester may be a partial ester of the acid anhydride.

Namely, the ester is represented by the following formula,

R—O—OC—Z—CO—O—R

HOOC—Z—CO—O—R or

HOOC—Z—CO—O—R—O—CO—Z—COOH wherein Z is an unsaturated aliphatic ring possessed by the acid anhydride and R is an organic group stemming from an alcohol used for the reaction.

The amide in the above derivatives is obtained by the reaction of the acid anhydride such as alkyltetrahydrophthalic anhydride with various amine compounds.

There is no specific limitation on the amine that is used, and there can be used either an aliphatic amine such as methylamine, ethylamine or propylamine, or an aromatic amine such as phenylamine or the like. Namely, either one of the two carbonyl groups forming the acid anhydride may have been amidated or both of them may have been amidated. Not being limited to the monoamine, further, there can be used a polyvalent amine such as diamine or triamine. In this case, there can be introduced the unsaturated alicyclic structures in a number corresponding to the number of amines in a molecule.

Of the above derivatives, the imide is the one that is obtained by imidating the amide by the heat treatment and is, for example, obtained by heat-treating the amide represented by the following formula,

HOOC—Z—CONH—R or

HOOC—Z—CONH—R—CONH—Z—COOH wherein Z is an unsaturated aliphatic ring possessed by the acid anhydride and R is an organic group stemming from an amine used for the reaction,
and is represented by the following formula,

Z—(CO)$_2$—N—R or

Z—(CO)$_2$—N—R—N—(CO)$_2$—Z wherein Z and R are as defined above.

As the imide of if the ring Z is a bicyclo[2.2.1]hepto-2-en, there can be concretely exemplified the compounds represented by the following formulas.

[Chemical 12]

[Chemical 13]

[Chemical 14]

[Chemical 15]

Of the acid anhydride derivatives, the imide is most desired as the oxygen-absorbing component (B).

Of the derivatives derived from the acid anhydride of the above formula (1), the dicarboxylic acid is the one formed by the hydrolysis of the acid anhydride and in which the anhydrous acid group is cleaved, and is expressed by the following formula,

HOOC—Z—COOH wherein Z and R are as defined above.

Of the above derivatives, a polymer having a constituent unit stemming from the acid anhydride is obtained by using the above acid anhydride as the dibasic acid component for forming the polyester. The copolymerized polyester has an unsaturated alicyclic structure in the molecular chain thereof, exhibits a predetermined oxygen-absorbing property (is capable of being oxidized) and, therefore, can be used as the oxygen-absorbing component (B). Specifically, the copolymerized polyester has a very high affinity for the polyester resin used as the base resin (A) and is very favorably used for homogeneously dispersing the oxygen-absorbing component (B).

The dibasic acid is used for producing the copolymerized polyester that serves as the oxygen-absorbing component (B), and can be represented by terephthalic acid, isophthalic acid, succinic acid and adipic acid. These dibasic acids together with the above acid anhydride are polycondensed with the diol component to produce the copolymerized polyester. The diol component can be represented by, for example, 1,4-butanediol, ethylene glycol, 1,6-hexanediol and neopentyl glycol.

In the copolymerized polymer, it is desired that the amount of the acid anhydride is in a range of 30 to 90 mol % and, specifically, 50 to 80 mol % per the whole dibasic acid. If the amount of the constituent unit stemming from the acid anhydride is small in the copolymerized polymer, the oxygen-absorbing property becomes poor, and the copolymerized polymer must be added in large amounts to the polyester resin composition. As a result, it becomes necessary to add the oxidation promotion component (C) that will be described later in large amounts, too, impairing, however, excellent properties of the thermoplastic resin (specifically, polyester resin) that is used as the base resin (A). For example, it becomes difficult to carry out the blow forming and, therefore, it may become difficult to form the containers. Further, a too large amount of the constituent unit stemming from the acid anhydride impairs such an advantage that the copolymerized polyester that is obtained exhibits a high affinity for the polyester resin that is used as the base resin (A). That is, the properties of the obtained copolymerized polyester become very different from the properties of the polyester resin (e.g., PET) that is used as the base resin (A), making it difficult to homogeneously disperse the copolymerized polyester (oxygen-absorbing component (B)) and causing the forming to become defective.

The copolymerized polyester having a number average molecular weight of, usually, about 1,000 to about 1,000,000 can be favorably used as the oxygen-absorbing component (B).

Among the above-mentioned various acid anhydride derivatives, the invention preferably uses those of low molecular weights, e.g., derivatives having molecular weights of not more than 2000 from the standpoint of transparency.

The amount of use of the oxygen-absorbing component (B) is so set as to attain sufficient oxygen-absorbing property without impairing properties such as formability and the like of the thermoplastic resin such as polyester resin used as the base resin (A). The amount thereof varies depending upon the embodiments and cannot be definitely specified but is, usually, in a range of 0.1 to 20% by weight and, specifically, 0.5 to 10% by weight calculated as the acid anhydride represented by the above formula (1) on the basis of the resin composition.

<Other Blending Agents>

The oxygen-absorbing resin composition of the present invention containing the above-mentioned components (A) and (B) can, as required, be used in combination with a compound having benzylhydrogen as represented by a styrene polymer such as polystyrene to further improve oxygen-absorbing property. Namely, the benzylhydrogen can be easily pulled out, i.e., pulled out at the time of, for example, melt-kneading, forms a stable radical that does not easily react with oxygen and, therefore, serves as a radical source that forms radicals of the oxygen-absorbing component (B) promoting the oxidation of the oxygen-absorbing component (B) when it comes in contact with oxygen. Therefore, use of the oxidation promotion component in combination makes it possible to further improve the oxygen-absorbing capability.

To further improve the oxygen-absorbing property, there can be used a transition metal catalyst that has been commonly used for the compositions of this kind.

Representative examples of the transition metal used for the transition metal catalyst of this kind include iron, cobalt, nickel, copper, silver, tin, titanium, zirconium, vanadium, chromium and manganese. Of them, cobalt is best desired for promoting the oxidation of the oxygen-absorbing component (B) and for improving the oxygen-absorbing property. The catalysts of these transition metals are, usually, used in the form of low-valence inorganic salts of the transition metals, organic salts thereof or complexes thereof. Their concrete forms have been known as closely described in, for example, JP-A-2004-161796.

Use of the transition metal catalyst, however, is often accompanied by such inconveniences as oxidation and deterioration of the base resin (A), a resulting decrease in the strength thereof, a decrease in the oxygen-barrier property as well as by-production of low-molecular decomposed products that could become a cause of offensive odor. Therefore, use thereof should be limited to such applications where the above inconveniences can be neglected. Even if used, the amounts thereof should be limited to be as small as possible. For instance, the amount of the transition metal catalyst should not be more than 1,000 ppm and, specifically, not more than 400 ppm calculated as metal per the resin composition. Most desirably, the transition metal catalyst should not be added at all, as a matter of course.

Further, the resin composition of the present invention can be blended with a known gas-barrier resin. Namely, the resin composition containing the above oxygen-absorbing component (B) has a function for improving the barrier property against oxygen upon absorbing oxygen by oxidation, but its barrier property against oxygen decreases with the passage of time. It is, therefore, desired to use the gas-barrier resin that has been known per se from the standpoint of effectively avoiding the above inconveniences and improving life of the oxygen-barrier property. Use of the gas-barrier resin is, further, advantageous for improving barrier property against other gases (e.g., water vapor, carbonic acid gas, etc.).

Representative examples of the gas-barrier resin include polyamide resins such as nylon 6, nylon 6.6, nylon 6/6•6 copolymer, polymetaxylylenediadipamide (MXD6), nylon 6•10, nylon 11, nylon 12 and nylon 13. Among these polyamides, a polymetaxylylenediadipamide having terminal amino groups in an amount of not less than 40 eq/$10^6$ g and, specifically, not less than 50 eq/$10^6$ g has a large resistance against being oxidized and deteriorated, and is desirable.

Further, a representative example of the gas-barrier resin other than the polyamide resin is an ethylene-vinyl alcohol copolymer. For example, there can be preferably used a saponified copolymer that is obtained by so saponifying an ethylene-vinyl acetate copolymer having an ethylene content of 20 to 60 mol % and, specifically, 25 to 50 mol % that the saponification degree thereof is not less than 96% and, specifically, not less than 99 mol %.

The above gas-barrier resin should have a molecular weight large enough for forming films.

Further, the resin composition of the invention can be blended with a known N-hydroxyphthalimide compound that works as an oxidation catalyst to improve oxygen-absorbing property. The N-hydroxyphthalimde compound permits the hydrogen atoms to be easily pulled out by molecular oxygen from the N-hydroxyimide groups, whereby the formed radicals pull out hydrogen atoms from the oxygen-absorbing component (B) to form alkyl radicals; i.e., the N-hydroxyphthalimide compound works as an oxidation catalyst.

As the N-hydroxyphthalimide compound, there can be exemplified:

N-hydroxyphthalimide,
N-hydroytetrachlorophthalimide,
N-hydroxytetrabromophthalimide,
N-hydroxyhexahydrophthalimide,
3-sulfonyl-N-hydroxyphthalimide,
3-methoxycarbonyl-N-hydroxyphthalimide,
3-methyl-N-hydroxyphthalimide,
3-hydroxy-N-hydroxyphthalimide,
4-nitro-N-hydroxyphthalimide,
4-chloro-N-hydroxyphthalimide,
4-methoxy-N-hydroxyphthalimide,
4-dimethylamino-N-hydroxyphthalimide,
4-carboxy-N-hydroxyhexahydrophthalimide, and
4-methyl-N-hydroxyhexahydrophthalimide.

The N-hydroxyphthalimide compound is added in an amount of, desirably, 0.001 to 1% by weight per the resin composition of the invention.

Further, the resin composition of the invention can be suitably blended with various blending agents such as filler, coloring agent, heat stabilizer, aging stabilizer, antioxidant, anti-aging agent, photo stabilizer, ultraviolet ray absorber, antistatic agent, lubricant like metal soap or wax, and reforming resin or rubber within ranges in which they do not impair excellent oxygen-absorbing property and formability of the resin composition.

<Preparation of the Oxygen-absorbing Resin Composition and Use>

The above-mentioned oxygen-absorbing resin composition is, usually, prepared by kneading the above-mentioned components in a non-oxidizing atmosphere by using an extruder or the like but can also be prepared by employing such means as mixing some of the components in advance and subsequently mixing the rest of the components thereto.

For example, part of the thermoplastic resin which is the base resin (A) is melt-kneaded together with the oxygen-absorbing component (B) and other blending agents that are suitably added by using a twin screw extruder while conducting the deaeration to prepare pellets of the master batch thereof, and the rest of the thermoplastic resin is kneaded together therewith for being formed just prior to the use. In this case, the thermoplastic resin used for preparing the master batch and the thermoplastic resin subsequently kneaded together therewith may have properties different from each other. By employing this means, it is allowed to adjust the properties depending upon the use.

If the transition metal catalyst is to be used, further, it is desired that the transition metal catalyst is dissolved in a suitable organic solvent (organic solvent of the type of, for example, alcohol, ether, ketone or hydrocarbon) to prepare a solution thereof which is then mixed with other components in a kneader such as extruder.

The oxygen-absorbing polyester resin composition of the invention exhibits oxygen-absorbing capability to a degree enough for maintaining gas-barrier property required in the field of packaging containers even without using particular components such as transition metal catalyst or oxidation promoter. Therefore, the resin composition of the present invention is not only very advantageous in regard to cost but also effectively alleviates deterioration of the base resin (A).

In absorbing oxygen, further, no low molecular decomposed product is by-produced that could become a cause of offensive odor. Therefore, the oxygen-absorbing resin composition is very suited for use in the field of packaging materials preventing the contents from being deteriorated by oxidation and without impairing the flavor. Accordingly, the oxygen-absorbing resin composition of the invention is favorably used as a packaging material in the forms of, for example, film, sheet, cup, tray, bottle, tube and lid. The oxygen-absorbing resin composition can also be used in the forms of powder, film, sheet and the like to absorb oxygen in the sealed packaging containers.

The oxygen-absorbing resin composition of the invention does not by-produce any low molecular decomposed product that could become a cause of offensive odor upon absorbing oxygen. If used for forming the packaging containers such as bag, cup, bottle, tube and the like, further, the layer comprising the resin composition can be positioned on the side where it comes in contact with the content in the container. Namely, it is allowable to form the packaging containers comprising the layer of the resin composition only.

By utilizing its excellent oxygen-barrier property of the layer of the resin composition based on the absorption of oxygen, it is allowed to decrease the thickness of the walls of the packaging containers of the single-layer structure and, therefore, to reduce the weight of the containers, save the resources and to lower the cost thereof.

The above packaging containers may be formed relying upon the means that has been known per se.; i.e., the resin composition is formed into a film by, for example, extrusion forming, and the film is stuck together by heat-sealing to obtain a bag-like container. Further, a preform of the shape of a sheet or test tube is formed by extrusion forming or injection molding, and is subjected to the secondary forming such as vacuum forming, expansion forming, compressed air forming, plug-assist forming or stretch blow molding to obtain a packaging container of the shape of cup, tray or bottle. Further, a packaging container of the tubular shape can be directly obtained relying on the extrusion forming, injection molding or extrusion blow molding.

Upon being combined with other resins or resin compositions, further, the oxygen-absorbing resin composition of the invention can be formed into a packaging container of a multilayer structure. Upon being multilayered, it is allowed not only to further improve barrier property against oxygen but also to improve barrier property against gases (e.g., carbonic acid gas and water vapor) in addition to oxygen and to maintain the oxygen-absorbing property for extended periods of time.

Described below are examples of the multilayer structure.
The layer constitutions are represented by the following abbreviations.
OAR: Oxygen-absorbing layer formed by using the oxygen-absorbing resin composition of the invention.
PET: Polyethylene terephthalate layer.
PE: Layer of a low-, intermediate- or high-density polyethylene, straight chain low-density polyethylene or linear very-low-density polyethylene.
PP: Polypropylene layer.
COC: Layer of a cyclic olefin resin.
GBAR: Gas-barrier layer of an aromatic polyamide or an ethylene vinyl alcohol copolymer.
Two-layer Structure:
  PET/OAR
Three-layer Structures:
  PE/OAR/PET
  PET/OAR/PET
  GBAR/OAR/PET
  PE/OAR/COC
Four-layer Structures:
  PE/PET/OAR/PET
  PE/OAR/GBAR/PET
  PET/OAR/GBAR/PET
  PE/OAR/GBAR/COC
  PE/OAR/GBAR/PE
Five-layer Structures:
  PET/OAR/PET/OAR/PET
  PE/PET/OAR/GBAR/PET
  PET/OAR/GBAR/COC/PET
  PET/OAR/PET/COO/PET
  PE/OAR/GBAR/COC/PET
  PE/GBAR/OAR/GBAR/PE
  PP/GBAR/OAR/GBAR/PP
Six-layer structures:
  PET/OAR/PET/OAR/GBAR/PET
  PE/PET/OAR/COC/GBAR/PET
  PET/OAR/GBAR/PET/COC/PET
  PE/GBAR/OAR/PE/GBAR/PE
  PP/GBAR/OAR/PP/GBAR/PP
Seven-layer Structure:
  PET/OAR/COC/PET/GBAR/OAR/PET In the above multilayer structures, an embodiment that includes the gas-barrier resin layer (GBAR) is desired from the standpoint of maintaining the oxygen-absorbing property of the oxygen-absorbing layer (OAR) for extended periods of time.

In the above multilayer structures, further, either side thereof may be on the inner surface side or on the outer surface side of the container.

Further, if adhesiveness is not enough among the layers, a layer of an adhesive resin such as olefin resin modified with an unsaturated carboxylic acid may be interposed among the layers.

By utilizing the multiplication of layers based on the co-extrusion or the co-injection, the packaging containers of the multilayer structures are produced by conducting the forming in the same manner as in forming the single-layer structure mentioned above.

Owing to its excellent oxygen-absorbing property, the packaging container provided with the layer of the oxygen-absorbing resin composition of the invention exhibits excellent oxygen-barrier property, and is very suited, irrespective of if it has the single-layer structure or the multilayer structure, for containing various kinds of contents that are subject to be deteriorated by the presence of oxygen, such as beverages like beer, wine, fruit juices, carbonated soft drinks, as well as fruits, nuts, vegetables, meat produce, infant's foods, coffee, jam, mayonnaise, ketchup, edible oils, dressings, sauces, food boiled down in soy, dairy products, pharmaceuticals, cosmetics, gasoline and the like.

Because of its excellent transparency, further, the packaging container of the invention can also be favorably used in a field where transparency is required.

EXAMPLES

The invention will now be described by way of the following Examples to which only, however, the invention is in no way limited.

Described below are materials and testing methods used in Examples and Comparative Examples.
1. Materials.
<Base Resin (A)>
(A1): Polyethylene terephthalate resin containing cyclohexanedimethanol (S2008: manufactured by SK Chemical Co.).
(A2): Polyethylene (G806: manufactured by Sumitomo Kagaku Kogyo Co.).
(A3): Ethylene-vinyl alcohol copolymer (L171B: manufactured by Kuraray Co.).
(A4): Polymetaxylylenediadipamide (T-620: manufactured by Toyobo Co.).
(A5): Polyethylene terephthalate (BK6180: manufactured by Nihon Unipet Co.).
(A6): Polyethylene terephthalate (RT543CTHT: manufactured by Nihon Unipet Co.).
<Starting Materials of the Oxygen-absorbing Component>
(BX):
A mixture of methyltetrahydrophthalic anhydrides containing 45% by weight of a 4-methyl-$\Delta^3$-tetrahydrophthalic anhydride and 21% by weight of a cis-3-methyl-$\Delta^4$-tetrahydrophthalic anhydride (HN-2200: manufactured by Hitachi Kasei Co.) was used as a starting material of the oxygen-absorbing component in the following Synthesis Examples.

In Comparative Examples 1 and 2, the mixture of methyltetrahydrophthalic anhydrides was directly used as the oxygen-absorbing component (BX).

Figure 1:
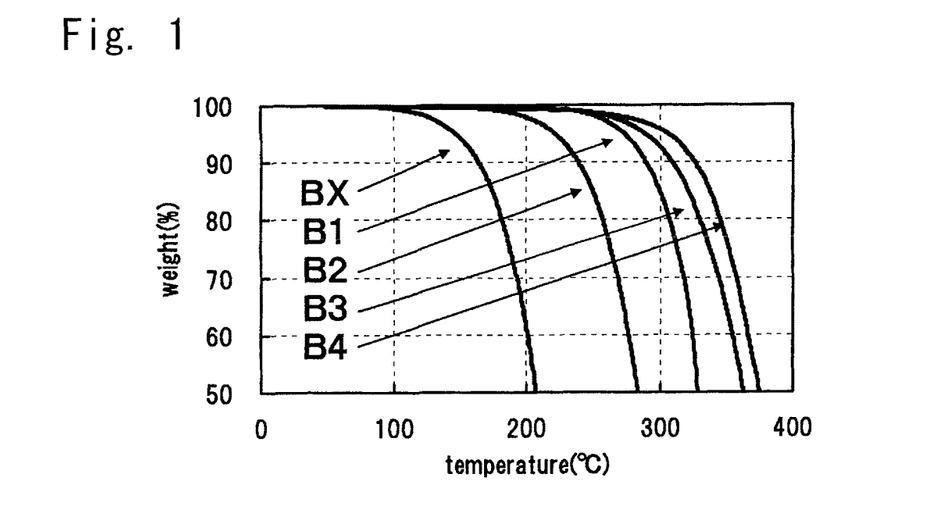
FIG. 1 is a diagram showing the results of the thermogravimetric analysis (TGA) of the oxygen-absorbing components BX, B1, B2, B3 and B4 used in Examples and Comparative Examples.

In FIG. 1, BX represents a TGA curve of the starting material of the oxygen-absorbing component.
(BY):
A 5-norbornene-2,3-dicarboxylic anhydride (manufactured by Tokyo Kasei Kogyo Co.) was used as a starting material of the oxygen-absorbing component.

In Comparative Example 3, the above compound was directly used as the oxygen-absorbing component (BY).
(BZ):
A methyl-5-norbornene-2,3-dicarboxylic anhydride (manufactured by Tokyo Kasei Kogyo Co.) was used as a starting material of the oxygen-absorbing component.

In Comparative Example 4, the above compound was directly used as the oxygen-absorbing component (BZ).
<Other Blending Agents>
  Transition metal catalyst: cobalt neodecanoate (DIC-NATE 5000: manufactured by Dainihon Ink Kagaku Kogyo Co.).
  Organic radical catalyst: NHPI (N-hydroxyphthalimide) (manufactured by Tokyo Kasei Kogyo Co.)

2. Synthesis of Oxygen-absorbing Components.

Synthesis Example 1

Into a 100-ml three neck distillation flask equipped with a nitrogen introduction pipe, there were fed 10 g of BX as the starting material of the oxygen-absorbing component and 14.5 g of a stearylamine (manufactured by Tokyo Kasei Kogyo Co.) as the amine component, and the reaction was conducted for about 6 hours in a nitrogen atmosphere at 120° C. to 180° C. while removing water that was generated. The reaction liquid was cooled and was dissolved in chloroform followed by washing with a 1N hydrochloric acid aqueous solution and, thereafter, by washing with a 1N sodium hydroxide aqueous solution. The organic layer was dehydrated with sodium sulfate and was, thereafter, heated under reduced pressure to obtain an oxygen-absorbing component (B1).

From the IR spectrum, there were confirmed the disappearance of a peak at 1780 cm$^{-1}$ stemming from the methyltetrahydrophthalic anhydride and the appearance of a peak at 1708 cm$^{-1}$ stemming from the imide.

In FIG. 1, B1 represents a TGA curve of the oxygen-absorbing component.

The following is the structural formula of the chief constituent component of the obtained oxygen-absorbing component.

[Chemical 16]

(B1)

Synthesis Example 2

The synthesis was conducted in the same manner as in Synthesis Example 1 but using 13 g of a laurylamine (manufactured by Tokyo Kasei Kogyo Co.) as the amine component to obtain an oxygen-absorbing component (B2).

In FIG. 1, B2 represents a TGA curve of the oxygen-absorbing component.

The following is the structural formula of the chief constituent component of the obtained oxygen-absorbing component.

[Chemical 17]

(B2)

Synthesis Example 3

The synthesis was conducted in the same manner as in Synthesis Example 1 but using 3.1 g of a hexamethylenediamine (manufactured by Tokyo Kasei Kogyo Co.) as the amine component to obtain an oxygen-absorbing component (B3).

In FIG. 1, B3 represents a TGA curve of the oxygen-absorbing component.

The following is the structural formula of the chief constituent component of the obtained oxygen-absorbing component.

[Chemical 18]

(B3)

Synthesis Example 4

The synthesis was conducted in the same manner as in Synthesis Example 1 but using 3.7 g of a metaxylylenediamine (manufactured by Tokyo Kasei Kogyo Co.) as the amine component to obtain an oxygen-absorbing component (B4).

In FIG. 1, B4 represents a TGA curve of the oxygen-absorbing component.

The following is the structural formula of the chief constituent component of the obtained oxygen-absorbing component.

[Chemical 19]

(B4)

Synthesis Example 5

The synthesis was conducted in the same manner as in Synthesis Example 1 but using 3.7 g of a paraxylylenediamine (manufactured by Tokyo Kasei Kogyo Co.) as the amine component to obtain an oxygen-absorbing component (B5).

Figure 2:
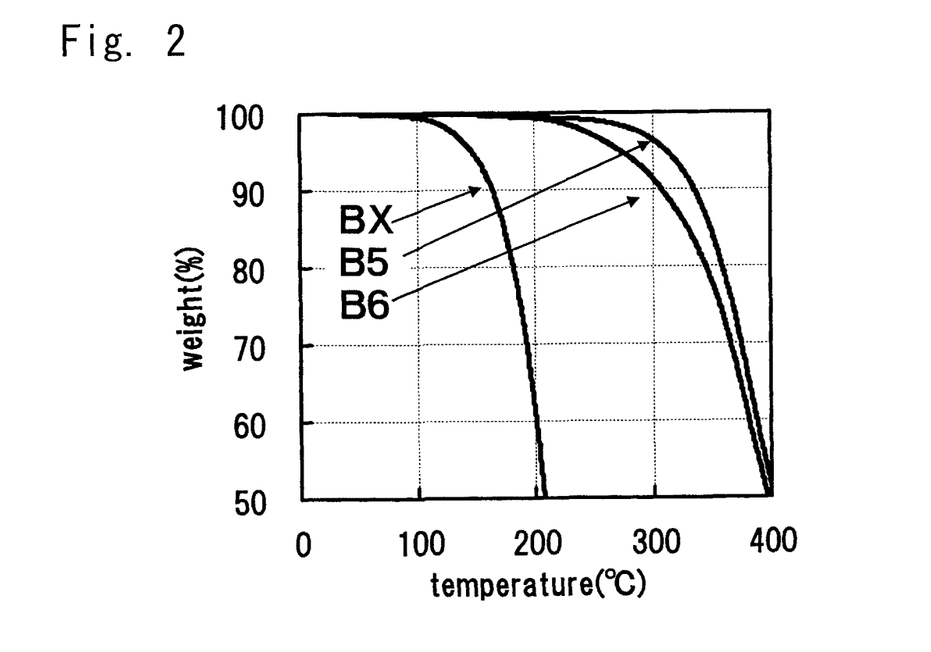
FIG. 2 is a diagram showing the results of the thermogravimetric analysis (TGA) of the oxygen-absorbing components BX, B5 and B6 used in Examples and Comparative Examples.

In FIG. 2, B5 represents a TGA curve of the oxygen-absorbing component.

The following is the structural formula of the chief constituent component of the obtained oxygen-absorbing component.

[Chemical 20]

(B5)

Synthesis Example 6

The synthesis was conducted in the same manner as in Synthesis Example 1 but using 3.85 g of a 1,3,-bis(aminomethyl) cyclohexane (manufactured by Tokyo Kasei Kogyo Co.) as the amine component to obtain an oxygen-absorbing component (B6).

In FIG. 2, B6 represents a TGA curve of the oxygen-absorbing component.

The following is the structural formula of the chief constituent component of the obtained oxygen-absorbing component.

[Chemical 21]

(B6)

Synthesis Example 7

10 Grams of BX was fed as the starting material of the oxygen-absorbing component into a 300-ml separable flask equipped with a stirrer, a nitrogen introduction pipe and a dropping funnel, and was substituted with nitrogen. Here, as an amine component, 3.7 g of a metaxylenediamine dissolved in ml of distilled water was added to the dropping funnel, and the precipitate that was formed was dried at 40° C. in vacuum for 12 hours to obtain an oxygen-absorbing component (B7).

The following is the structural formula of the chief constituent component of the obtained oxygen-absorbing component.

[Chemical 22]

(B7)

Synthesis Example 8

Into a 300-ml separable flask equipped with a stirrer and a nitrogen introduction pipe, there were fed 25.0 g of BX as the starting material of the oxygen-absorbing component, 30.0 g of a bishydroxyethyl terephthalate (BHET) (manufactured by Tokyo Kasei Kogyo Co.) and 0.25 g of a titanium tetraisopropoxide (manufactured by Kishida Co.) as the esterification catalyst, and the reaction was conducted for about 6 hours in a nitrogen atmosphere at 120° C. to 180° C. while removing water that was formed to obtain an oxygen-absorbing component (B8) that comprised of a copolymerized polyester formed from the constituent monomer BX that was the starting material of the terephthalic acid-ethylene glycol oxygen-absorbing component.

Synthesis Example 9

The synthesis was conducted in the same manner as in Synthesis Example 8 but using 26.6 g of BX as the starting material of the oxygen-absorbing component and 20.0 g of BHET to obtain an oxygen-absorbing component (B9) comprised of a copolymerized polyester formed from the constituent monomer BX that was the starting material of the terephthalic acid-ethylene glycol oxygen-absorbing component.

Synthesis Example 10

Into a 300-ml separable flask equipped with a stirrer, a nitrogen introduction pipe and the Dean-Stark type water separator, there were fed 25 g of a phthalic anhydride (manufactured by Tokyo Kasei Kogyo Co.), 10.7 g of a metaxylenediamine, 15 ml of toluene (manufactured by Wako Junyaku Co.) and 15 ml of an N,N-dimethylformamide (DMF) (manufactured by Wako Junyaku Co.), and the reaction was conducted for about 4 hours in a nitrogen atmosphere at 120° C. while removing water that was generated. 100 Milliliters of a 2-propanol was added to the reaction liquid, and the obtained slurry thereof was filtered by suction and was washed with 25 mL of the 2-propanol followed by drying at 40° C. in vacuum for 12 hours to obtain a compound (B10).

The following is the structural formula of the obtained compound.

[Chemical 23]

(B10)

Synthesis Example 11

Synthesis was conducted in the same manner as in Synthesis Example 10 but feeding 25 g of a 1,2,3,6-tetrahydrophthalic anhydride (Rikashid TH: manufactured by Shin-Nihon Rika Co.), 11.1 g of a metaxylenediamine, 15 ml of toluene and 15 ml of DMF to obtain a compound (B11).

The following is the structural formula of the obtained compound.

[Chemical 24]

(B11)

Synthesis Example 12

Into a 300-ml separable flask equipped with a stirrer, a nitrogen introduction pipe and the Dean-Stark type water separator, there were fed 25 g of BY as the starting material of the oxygen-absorbing component, 10.36 g of a metaxylenediamine, 20 g of xylene (manufactured by Wako Junyaku Co.) and 13.6 g an N-methylpyrrolidone (manufactured by Wako Junyaku Co.), and the reaction was conducted for about 4 hours in a nitrogen atmosphere at 120 to 160° C. while removing water that was generated. The reaction liquid was added to 200 mL of the 2-propanol, and the obtained slurry thereof was filtered by suction and was washed with 25 mL of the 2-propanol followed by drying at 40° C. in vacuum for 12 hours to obtain an oxygen-absorbing component (B12).

The following is the structural formula of the obtained oxygen-absorbing component.

[Chemical 25]

(B12)

Synthesis Example 13

Into a 300-ml separable flask equipped with a stirrer, a nitrogen introduction pipe and the Dean-Stark type water separator, there were fed 25 g of BY as the starting material of the oxygen-absorbing component, 24.6 g of a stearylamine, 20 g of xylene (manufactured by Wako Junyaku Co.) and 13.6 g an N-methylpyrrolidone (manufactured by Wako Junyaku Co.), and the reaction was conducted for about 4 hours in a nitrogen atmosphere at 120 to 160° C. while removing water that was formed. The reaction liquid was added to 200 mL of the distilled water, and the obtained slurry thereof was filtered by suction and was washed with 25 mL of the distilled water followed by drying at 40° C. in vacuum for 12 hours to obtain an oxygen-absorbing component (B13).

The following is the structural formula of the obtained oxygen-absorbing component.

[Chemical 26]

(B13)

Synthesis Example 14

Synthesis was conducted in the same manner as in Synthesis Example 12 but using 25 g of BZ as the starting material of the oxygen-absorbing component and 9.55 g of a metaxylenediamine to obtain an oxygen-absorbing component (B14).

The following is the structural formula of the obtained oxygen-absorbing component.

[Chemical 27]

(B14)

Synthesis Example 15

Synthesis was conducted in the same manner as in Synthesis Example 13 but using 25 g of BZ as the starting material of the oxygen-absorbing component and 37.78 g of a stearylamine to obtain an oxygen-absorbing component (B15).

The following is the structural formula of the obtained oxygen-absorbing component.

[Chemical 28]

(B15)

3. Oxygen-absorbing Resin Pellets.

By using a twin screw extruder equipped with a pelletizing facility (TEM-35B: manufactured by Toshiba Kikai Co.), the base resin A was mixed and kneaded with various constituent components, and the mixture thereof was extruded in a stranded manner to obtain the resin composition pellets thereof.

Here, the temperature of the barrel was set as follows depending on the base resins:
A1, A2 200° C.
A3 220° C.
A4 260° C.
A5, A6 280° C.

The constituent components were introduced in such a manner that the solid pellets were dry-blended with the polyester resin, and the liquid components were added through an feed port on the way of the extruder by using a liquid feeder (Moineau pump: manufactured by Heishin Sobi Co.).

4. Measuring the Amounts of Oxygen Absorbed.

Various kinds of resin composition pellets were pulverized by using a freeze-pulverizer and their amounts were measured. Thereafter, the resin composition pellets were put into an oxygen-impermeable container [Hiretoflex: cup-like container of laminated layers of polypropylene/steel foil/polypropylene manufactured by Toyo Seikan Co.] of a capacity of 58 ml. The container was then heat-sealed with a lid member of polypropylene (inner layer)/aluminum foil/polyester (outer layer), and the resin composition pellets were preserved therein under the conditions of 23° C. and 50° C. After 7 days have passed, the oxygen concentration in the container was measured by using a micro gas chromatography (M200: manufactured by Agilent Technologies Co.), and the amount of oxygen absorbed (cc/g) was calculated.

5. Measurement Based on the Thermogravimetric Analysis (TGA).

By using a thermogravimetric analyzer (TGA7: manufactured by Perkin-Elmer Co.), the oxygen-absorbing components were tested under a condition of a heating rate of 10° C./min. The results were as shown in FIGS. 1 and 2.

Example 1

The base resin A1 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 2

The base resin A1 was blended with 10% by weight of the oxygen-absorbing component B2 on the resin composition basis to prepare resin composition pellets thereof according to the method mentioned above, and the amount of oxygen absorbed by the resin composition (cc/g) was calculated. The result was as shown in Table 1.

Example 3

The base resin A1 was blended with 10% by weight of the oxygen-absorbing component B3 on the resin composition basis to prepare resin composition pellets thereof according to the method mentioned above, and the amount of oxygen absorbed by the resin composition (cc/g) was calculated. The result was as shown in Table 1.

Example 4

The base resin A1 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 5

The base resin A1 was blended with 10% by weight of the oxygen-absorbing component B1 on the resin composition basis and 0.035% by weight (350 ppm) of the transition metal catalyst calculated as metal on the resin composition basis to prepare resin composition pellets thereof according to the method mentioned above, and the amount of oxygen absorbed by the resin composition (cc/g) was calculated. The result was as shown in Table 1.

Example 6

The base resin A1 was blended with 10% by weight of the oxygen-absorbing component B2 on the resin composition basis and 0.035% by weight (350 ppm) of the transition metal catalyst calculated as metal on the resin composition basis to prepare resin composition pellets thereof according to the method mentioned above, and the amount of oxygen absorbed by the resin composition (cc/g) was calculated. The result was as shown in Table 1.

Example 7

The base resin A1 was blended with 10% by weight of the oxygen-absorbing component B3 on the resin composition basis and 0.035% by weight (350 ppm) of the transition metal catalyst calculated as metal on the resin composition basis to prepare resin composition pellets thereof according to the method mentioned above, and the amount of oxygen absorbed by the resin composition (cc/g) was calculated. The result was as shown in Table 1.

Example 8

The base resin A1 was blended with 10% by weight of the oxygen-absorbing component B4 on the resin composition basis and 0.035% by weight (350 ppm) of the transition metal catalyst calculated as metal on the resin composition basis to prepare resin composition pellets thereof according to the method mentioned above, and the amount of oxygen absorbed by the resin composition (cc/g) was calculated. The result was as shown in Table 1.

Example 9

The base resin A2 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 10

The base resin A2 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 11

The base resin A3 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 12

The base resin A3 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 13

The base resin A4 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 14

The base resin A4 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 15

The base resin A1 was blended with 10% by weight of the oxygen-absorbing component B5 on the resin composition basis to prepare resin composition pellets thereof according to the method mentioned above, and the amount of oxygen absorbed by the resin composition (cc/g) was calculated. The result was as shown in Table 1.

Example 16

The base resin A1 was blended with 10% by weight of the oxygen-absorbing component B6 on the resin composition basis to prepare resin composition pellets thereof according to the method mentioned above, and the amount of oxygen absorbed by the resin composition (cc/g) was calculated. The result was as shown in Table 1.

Example 17

The base resin A1 was blended with 10% by weight of the oxygen-absorbing component B7 on the resin composition basis to prepare resin composition pellets thereof according to the method mentioned above, and the amount of oxygen absorbed by the resin composition (cc/g) was calculated. The result was as shown in Table 1.

Example 18

The base resin A5 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 19

The base resin A5 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 20

The base resin A6 was blended with 10% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 21

The base resin A6 was blended with 10% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 22

The base resin A1 was blended with 5% by weight of the oxygen-absorbing component B1 on the resin composition basis to prepare resin composition pellets thereof according to the method mentioned above, and the amount of oxygen absorbed by the resin composition (cc/g) was calculated. The result was as shown in Table 1.

Example 23

The base resin A1 was blended with 5% by weight of the oxygen-absorbing component B4 on the resin composition basis to prepare resin composition pellets thereof according to the method mentioned above, and the amount of oxygen absorbed by the resin composition (cc/g) was calculated. The result was as shown in Table 1.

Example 24

The base resin A1 was blended with 5% by weight of the oxygen-absorbing component B1 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 25

The base resin A1 was blended with 5% by weight of the oxygen-absorbing component B4 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 26

The base resin A1 was blended with 10% by weight of the oxygen-absorbing component B8 on the resin composition basis to prepare resin composition pellets thereof according to the method mentioned above, and the amount of oxygen absorbed by the resin composition (cc/g) was calculated. The result was as shown in Table 1.

Example 27

The base resin A1 was blended with 10% by weight of the oxygen-absorbing component B9 on the resin composition basis to prepare resin composition pellets thereof according to the method mentioned above, and the amount of oxygen absorbed by the resin composition (cc/g) was calculated. The result was as shown in Table 1.

Example 28

The base resin A1 was blended with 10% by weight of the oxygen-absorbing component B12 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 29

The base resin A1 was blended with 10% by weight of the oxygen-absorbing component B13 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 30

The base resin A1 was blended with 10% by weight of the oxygen-absorbing component B14 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 31

The base resin A1 was blended with 10% by weight of the oxygen-absorbing component B15 and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Example 32

The base resin A5 was blended with 10% by weight of the oxygen-absorbing component B13 and 0.035% by weight (350 ppm) of the above transition metal catalyst calculated as metal both on the resin composition basis to prepare resin composition pellets thereof according to the method mentioned above, and the amount of oxygen absorbed by the resin composition (cc/g) was calculated. The result was as shown in Table 1.

Example 33

The base resin A5 was blended with 10% by weight of the oxygen-absorbing component B15 and 0.035% by weight (350 ppm) of the above transition metal catalyst calculated as metal both on the resin composition basis to prepare resin composition pellets thereof according to the method mentioned above, and the amount of oxygen absorbed by the resin composition (cc/g) was calculated. The result was as shown in Table 1.

Comparative Example 1

The base resin A1 was blended with 10% by weight of the oxygen-absorbing component BX on the resin composition basis to prepare resin composition pellets thereof according to the method mentioned above, and the amount of oxygen absorbed by the resin composition (cc/g) was calculated. The result was as shown in Table 1.

Comparative Example 2

The base resin A1 was blended with 10% by weight of the oxygen-absorbing component BX and 0.035% by weight (350 ppm) of the above transition metal catalyst calculated as metal on the resin composition basis to prepare resin composition pellets thereof according to the method mentioned above, and the amount of oxygen absorbed by the resin composition (cc/g) was calculated. The result was as shown in Table 1.

Comparative Example 3

The base resin A1 was blended with 10% by weight of the compound B10 on the resin composition basis to prepare resin composition pellets thereof according to the method mentioned above, and the amount of oxygen absorbed by the resin composition (cc/g) was calculated. The result was as shown in Table 1.

Comparative Example 4

The base resin A1 was blended with 10% by weight of the compound B11 on the resin composition basis to prepare resin composition pellets thereof according to the method mentioned above, and the amount of oxygen absorbed by the resin composition (cc/g) was calculated. The result was as shown in Table 1.

Comparative Example 5

The base resin A1 was blended with 10% by weight of the starting material BY of the oxygen-absorbing component and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

Comparative Example 6

The base resin A1 was blended with 10% by weight of the starting material BZ of the oxygen-absorbing component and 0.5% by weight of the NHPI as the organic radical catalyst both on the resin composition basis to prepare resin composition pellets thereof according to the method mentioned above, and the amount of oxygen absorbed by the resin composition (cc/g) was calculated. The result was as shown in Table 1.

TABLE 1

| | Base resin (A) | Oxygen-absorbing Component (B) | | Transition metal catalyst | Organic radical catalyst | | Oxygen Absorption (cc/g) | Oxygen Absorption (cc/g) |
|---|---|---|---|---|---|---|---|---|
| | | Chemical species | Amount (wt %) | Amount (ppm as metal) | Chemical species | Amount (wt %) | 23° C. 7 days | 50° C. 7 days |
| Ex. 1 | A1 | B1 | 10 | no | no | | 0.003 | 2.914 |
| Ex. 2 | A1 | B2 | 10 | no | no | | 0.021 | 1.047 |
| Ex. 3 | A1 | B3 | 10 | no | no | | 0.022 | 0.237 |
| Ex. 4 | A1 | B4 | 10 | no | no | | 0.036 | 0.482 |
| Ex. 5 | A1 | B1 | 10 | 350 | no | | 0.042 | 5.807 |
| Ex. 6 | A1 | B2 | 10 | 350 | no | | 0.028 | 4.931 |
| Ex. 7 | A1 | B3 | 10 | 350 | no | | 0.028 | 0.260 |
| Ex. 8 | A1 | B4 | 10 | 350 | no | | 0.060 | 0.347 |
| Ex. 9 | A2 | B1 | 10 | no | no | | 0.109 | 0.061 |
| Ex. 10 | A2 | B4 | 10 | no | no | | 0.194 | 0.486 |
| Ex. 11 | A3 | B1 | 10 | no | no | | 0.053 | 0.068 |
| Ex. 12 | A3 | B4 | 10 | no | no | | 0.029 | 0.263 |
| Ex. 13 | A4 | B1 | 10 | no | no | | 0.113 | 0.127 |
| Ex. 14 | A4 | B4 | 10 | no | no | | 0.114 | 0.122 |
| Ex. 15 | A1 | B5 | 10 | no | no | | 0.007 | 0.041 |
| Ex. 16 | A1 | B6 | 10 | no | no | | 0.024 | 0.047 |
| Ex. 17 | A1 | B7 | 10 | no | no | | 0.054 | 0.113 |
| Ex. 18 | A5 | B1 | 10 | no | no | | 0.030 | 0.457 |
| Ex. 19 | A5 | B4 | 10 | no | no | | 0.008 | 0.029 |
| Ex. 20 | A6 | B1 | 10 | no | no | | 0.025 | 0.352 |
| Ex. 21 | A6 | B4 | 10 | no | no | | 0.002 | 0.073 |
| Ex. 22 | A1 | B1 | 5 | no | no | | 0.001 | 0.062 |
| Ex. 23 | A1 | B4 | 5 | no | no | | 0.026 | 0.092 |
| Ex. 24 | A1 | B1 | 5 | no | NHPI | 0.5 | 0.075 | 1.101 |
| Ex. 25 | A1 | B4 | 5 | no | NHPI | 0.5 | 0.070 | 0.776 |
| Ex. 26 | A1 | B8 | 10 | no | no | | 0.037 | — |
| Ex. 27 | A1 | B9 | 10 | no | no | | 0.075 | — |
| Ex. 28 | A1 | B12 | 10 | no | NHPI | 0.5 | 0.035 | — |
| Ex. 29 | A1 | B13 | 10 | no | NHPI | 0.5 | 0.052 | — |
| Ex. 30 | A1 | B14 | 10 | no | NHPI | 0.5 | 0.040 | — |
| Ex. 31 | A1 | B15 | 10 | no | NHPI | 0.5 | 0.058 | — |

TABLE 1-continued

|  | Base resin (A) | Oxygen-absorbing Component (B) | | Transition metal catalyst | Organic radical catalyst | | Oxygen Absorption (cc/g) | Oxygen Absorption (cc/g) |
|  |  | Chemical species | Amount (wt %) | Amount (ppm as metal) | Chemical species | Amount (wt %) | 23° C. 7 days | 50° C. 7 days |
| --- | --- | --- | --- | --- | --- | --- | --- | --- |
| Ex. 32 | A5 | B13 | 10 | 350 | no |  | 0.089 | — |
| Ex. 33 | A5 | B15 | 10 | 350 | no |  | 0.103 | — |
| Comp. Ex. 1 | A1 | BX | 10 | no | no |  | 0.000 | — |
| Comp. Ex. 2 | A1 | BX | 10 | 350 | no |  | — | 0.000 |
| Comp. Ex. 3 | A1 | B10 | 10 | no | no |  | 0.000 | — |
| Comp. Ex. 4 | A1 | B11 | 10 | no | no |  | 0.000 | — |
| Comp. Ex. 5 | A1 | BY | 10 | no | NHPI | 0.5 | 0.000 | — |
| Comp. Ex. 6 | A1 | BZ | 10 | no | NHPI | 0.5 | 0.000 | — |

The invention claimed is:
1. An oxygen-absorbing resin composition containing:
 (A) a base resin which comprises a thermoplastic resin; and
 (B) an oxygen-absorbing component which comprises an imide obtained by heat treating an amide,
 wherein, said amide is obtained by reacting an acid anhydride represented by formula 2 or formula 3:

(2)

(3)

with an aliphatic amine that has no carboxyl group and no aromatic ring; and
 wherein the oxygen-absorbing resin composition includes no compound that contains benzylhydrogen.

2. The oxygen-absorbing resin composition according to claim 1, wherein said base resin (A) is a polyester resin.

3. A packaging container forming, in the container wall thereof, at least one layer which comprises the oxygen-absorbing resin composition of claim 1.

4. The packaging container according to claim 3, wherein the layer of said oxygen-absorbing resin composition is formed at a position where it comes in contact with the content in the container.

5. The packaging container according to claim 3, wherein the container wall comprises a layer of said oxygen-absorbing resin composition only.

* * * * *